(12) United States Patent
Bates et al.

(10) Patent No.: US 9,253,138 B2
(45) Date of Patent: *Feb. 2, 2016

(54) FILTERING MESSAGE POSTS IN A SOCIAL NETWORK

(71) Applicant: International Business Machines Corporation, Armonk, NY (US)

(72) Inventors: Cary L. Bates, Rochester, MN (US);
Jason A. Nikolai, Rochester, MN (US);
Jeffrey A. Prentice, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/684,744

(22) Filed: Nov. 26, 2012

(65) Prior Publication Data
US 2013/0282841 A1   Oct. 24, 2013

Related U.S. Application Data

(63) Continuation of application No. 13/449,507, filed on Apr. 18, 2012.

(51) Int. Cl.
*H04L 12/58* (2006.01)

(52) U.S. Cl.
CPC ............... *H04L 51/32* (2013.01); *H04L 51/12* (2013.01)

(58) Field of Classification Search
CPC .......... H04L 12/58; H04L 51/12; H04L 51/32
USPC ........................................................ 709/217
See application file for complete search history.

(56) References Cited

U.S. PATENT DOCUMENTS

| 7,774,711 | B2 | 8/2010 | Valeski | |
|---|---|---|---|---|
| 7,832,003 | B2 | 11/2010 | Kelly et al. | |
| 8,621,007 | B2* | 12/2013 | Christoff et al. | 709/206 |
| 2003/0101227 | A1* | 5/2003 | Fink | 709/207 |
| 2003/0204604 | A1* | 10/2003 | Adar et al. | 709/228 |
| 2004/0154022 | A1* | 8/2004 | Boss et al. | 719/310 |
| 2006/0161423 | A1* | 7/2006 | Scott et al. | 704/10 |
| 2007/0130368 | A1* | 6/2007 | Martin et al. | 709/245 |
| 2008/0005325 | A1* | 1/2008 | Wynn et al. | 709/225 |
| 2008/0046976 | A1 | 2/2008 | Zuckerberg | |

(Continued)

OTHER PUBLICATIONS

Baden, Randy, :Persona: An Online Social Network with User-Defined Privacy, SIGCOMM '09 Proceedings of the Acm Sigcomm 2009 Conference on Data Communication, Oct. 2009.

(Continued)

*Primary Examiner* — Brian J Gillis
*Assistant Examiner* — Steve Lin
(74) *Attorney, Agent, or Firm* — Martin & Associates, LLC; Derek P. Martin

(57) ABSTRACT

A social media mechanism processes messages for content that may require filtering of recipients of the message, and informs a user who drafted the message when the message might need to be filtered so it is not sent to all potential recipients of the message. The user may then select to send the message to all potential recipients, or to filter the recipients so the message is sent to less than all of the potential recipients. User profiles are created and maintained, and may include information that helps to determine when filtering of messages is desirable. Feedback buttons are also provided to provide feedback when a user does not like a message.

6 Claims, 7 Drawing Sheets

(56) References Cited

U.S. PATENT DOCUMENTS

| | | |
|---|---|---|
| 2009/0063481 A1* | 3/2009 | Faus et al. .................. 707/6 |
| 2009/0070334 A1 | 3/2009 | Callahan et al. |
| 2009/0271481 A1* | 10/2009 | Becker .................. 709/204 |
| 2009/0307345 A1 | 12/2009 | Carter et al. |
| 2010/0017194 A1* | 1/2010 | Hammer et al. .................. 704/9 |
| 2010/0036829 A1* | 2/2010 | Leyba .................. 707/5 |
| 2010/0146443 A1 | 6/2010 | Zuckerberg et al. |
| 2010/0293170 A1* | 11/2010 | Hall et al. .................. 707/750 |
| 2011/0041082 A1* | 2/2011 | Nguyen .................. 715/752 |
| 2011/0078587 A1* | 3/2011 | Guy et al. .................. 715/752 |
| 2011/0202606 A1* | 8/2011 | Agarwal et al. .................. 709/206 |
| 2012/0042019 A1* | 2/2012 | Koul et al. .................. 709/206 |
| 2012/0066314 A1* | 3/2012 | Hardy .................. 709/206 |
| 2013/0047099 A1* | 2/2013 | Markman et al. .................. 715/758 |
| 2013/0117281 A1* | 5/2013 | Fleet et al. .................. 707/748 |

OTHER PUBLICATIONS

Baatarjav et al., "Group Recommendation System for Facebook", OTM 2008 Workshops, LNCS 5333, pp. 211-219, 2008.

* cited by examiner

FILTERING MESSAGE POSTS IN A SOCIAL NETWORK

BACKGROUND

1. Technical Field

This disclosure generally relates to social networking, and more specifically relates to filtering message posts in a social network.

2. Background Art

Social media has become an important means of communication in our modern world. For example, many people have accounts with Facebook and Twitter, allowing them to post messages to a large number of people at one time. While some social media allows the user to create certain groups to which messages may be sent, setting up and using such groups is a manual process that does not reflect how people communicate in the real world. Many people post messages on social media that may be received by a large number of people, including people who may prefer not to see certain messages.

BRIEF SUMMARY

A social media mechanism processes messages for content that may require filtering of recipients of the message, and informs a user who drafted the message when the message might need to be filtered so it is not sent to all potential recipients of the message. The user may then select to send the message to all potential recipients, or to filter the recipients so the message is sent to less than all of the potential recipients. User profiles are created and maintained, and may include information that helps to determine when filtering of messages is desirable. Feedback buttons are also provided to provide feedback when a user does not like a message.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a social media mechanism that processes messages for content that may require filtering of recipients of the message, and informs a user who drafted the message when the message might need to be filtered so it is not sent to all potential recipients of the message. The user may then select to send the message to all potential recipients, or to filter the recipients so the message is sent to less than all of the potential recipients. User profiles are created and maintained, and may include information that helps to determine when filtering of messages is desirable. Feedback buttons are also provided to provide feedback when a user does not like a message.

Figure 1:
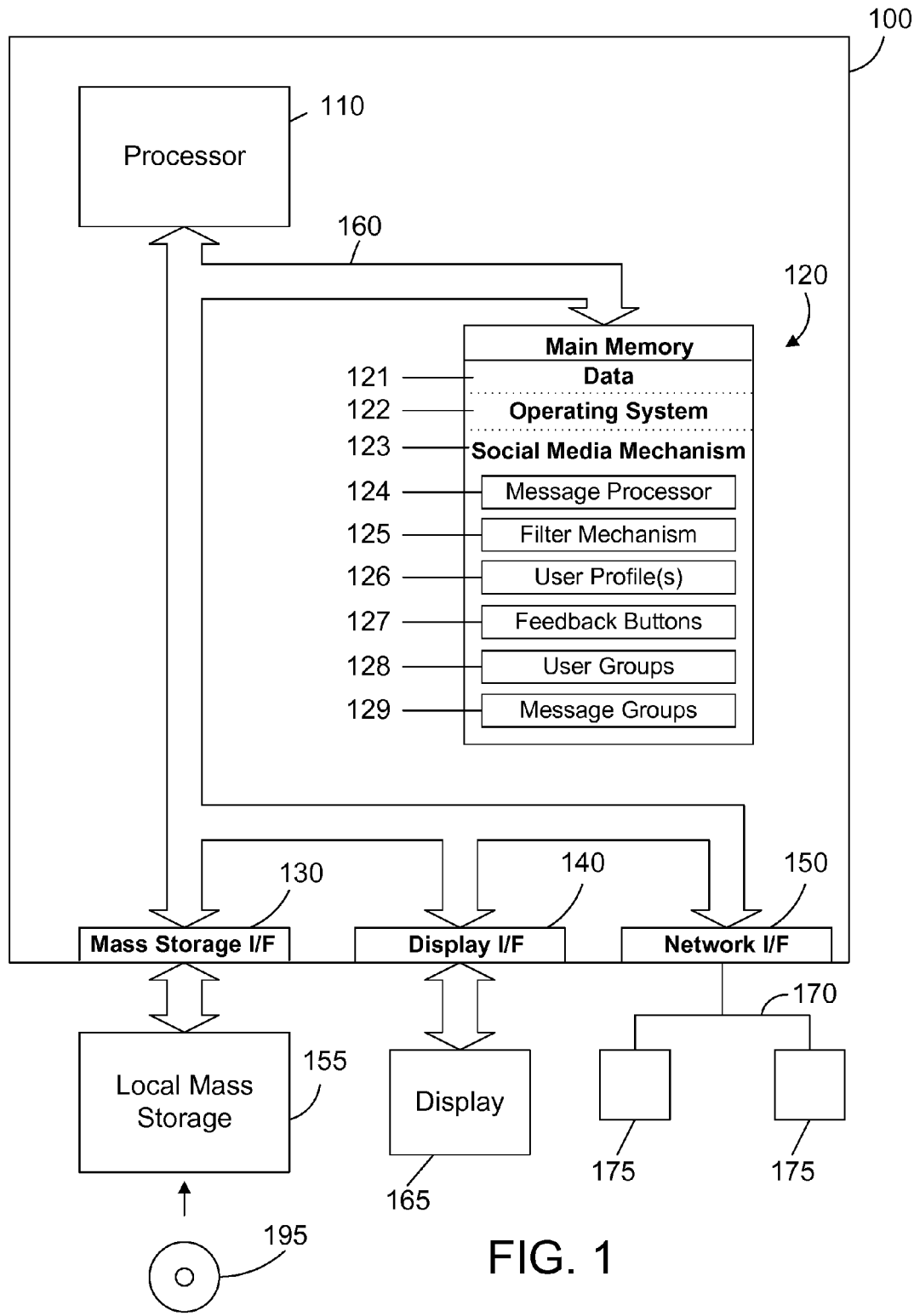
FIG. 1 is a block diagram of an apparatus that includes a social media mechanism that filters recipients of messages.

Referring to FIG. 1, a computer system 100 is one suitable implementation of a computer system that includes a social media mechanism. Computer system 100 is an IBM eServer System x computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195.

Main memory 120 preferably contains data 121, an operating system 122, and a social media mechanism 123. Data 121 represents any data that serves as input to or output from any program in computer system 100. Operating system 122 is a multitasking operating system. Social media mechanism 123 is a software program that provides social media capabilities to computer system 100 by interacting with other social media mechanisms on other computer systems. The social media mechanism 123 includes a message processor 124, a filter mechanism 125, one or more user profiles 126, feedback buttons 127, user groups 128, and message groups 129. The message processor 124 processes a message created by a user to see if potential recipients of the message may need to be filtered. The filter mechanism 125 determines whether or not potential recipients of a message should be filtered or not. User profile(s) 126 include information pertaining to users, some of which may be used in determining whether or not to filter a user from a message post. Feedback buttons provide ways for users to give feedback regarding message posts they receive. User groups 128 are defined groups of users. Message groups 129 are defined groups of messages. These items 124-129 are discussed in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and social media mechanism 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the social media mechanism 123.

Although computer system 100 is shown to contain only a single processor and a single system bus, those skilled in the art will appreciate that a social media mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, Streams Processing language, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The methods disclosed herein may be performed as part of providing a web-based service. Such a service could include, for example, offering the method to online users in exchange for payment.

Figure 2:
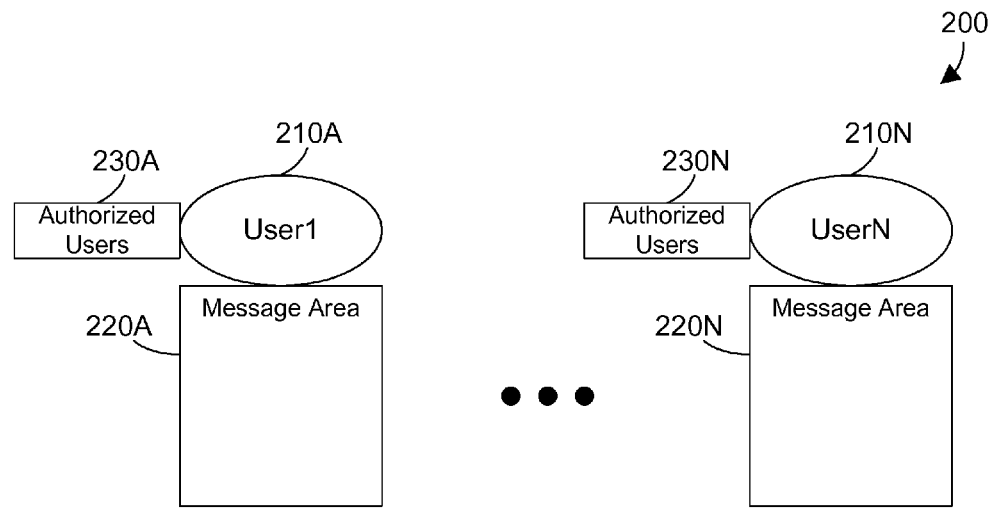
FIG. 2 is a block diagram of a prior art social media system.

Referring to FIG. 2, a prior art social media system 200 includes multiple users that each have a message area where messages may be posted and one or more authorized users. FIG. 2 shows multiple users as User1, . . . , UserN, and each user has its corresponding message area and authorized users. Thus, User1 210A includes a message area 220A and authorized users 230A, through UserN 210N which includes a message area 220N and authorized users 230N. Prior art social media system 200 describes known social media systems such as Facebook and Twitter that allow a message posted to the message area to be viewed by all authorized users.

Figure 3:
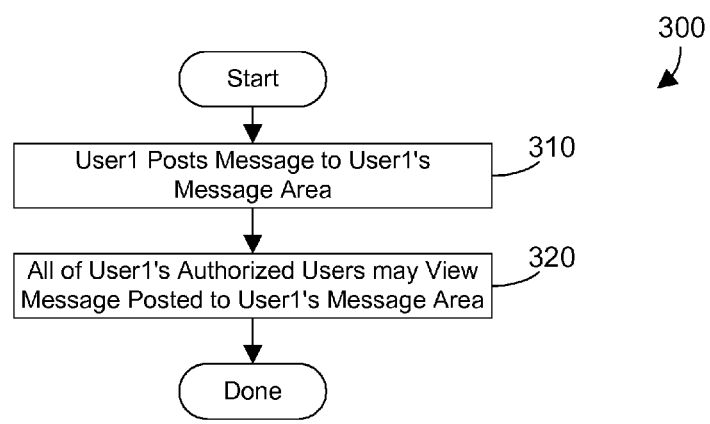
FIG. 3 is a flow diagram of a first method for the prior art social media system in FIG. 2.
Figure 4:
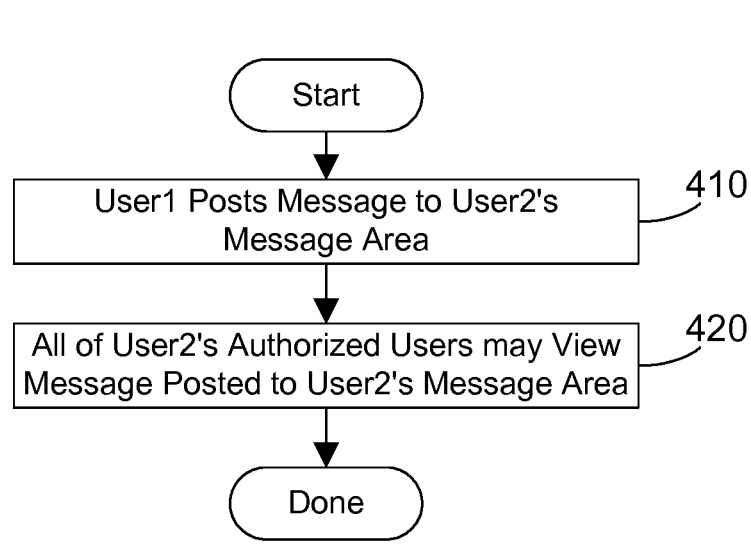
FIG. 4 is a flow diagram of a second method for the prior art social media system in FIG. 2.

Referring to FIG. 3, a method 300 describes one aspect of how the prior art social media system 200 in FIG. 2 functions. A user may post messages to his or her message area (step 310). All of that user's authorized users may view the message posted to the user's message area (step 320). For example, if a social media user writes to his or her message area, all of his or her authorized users may view what the user writes on his or her message area. Referring to FIG. 4, a method 400 describes another aspect of how the prior art social media system 200 in FIG. 2 functions. A user may post a message to a different user's message area (step 410). All of that user's authorized users may then view the message (step 420). Thus, when a first user posts a message to a second user's message area, all of the second user's authorized users will be able to see the post. Prior art methods 300 and 400 illustrate using social media to communicate, but the type of communication is not consistent with how human beings communicate in the real world. People communicate differently with different groups of people. When one family member communicates with another family member, she does not necessarily want that communication to go to some unknown list of authorized users. When a person communicates with a co-worker, the person does not necessarily want the message to be posted to all of the co-worker's authorized users. Known social media systems allow creating groups. However, creating and maintaining such groups is a manual and time-consuming process, and still does not reflect how people normally communicate.

Figure 5:
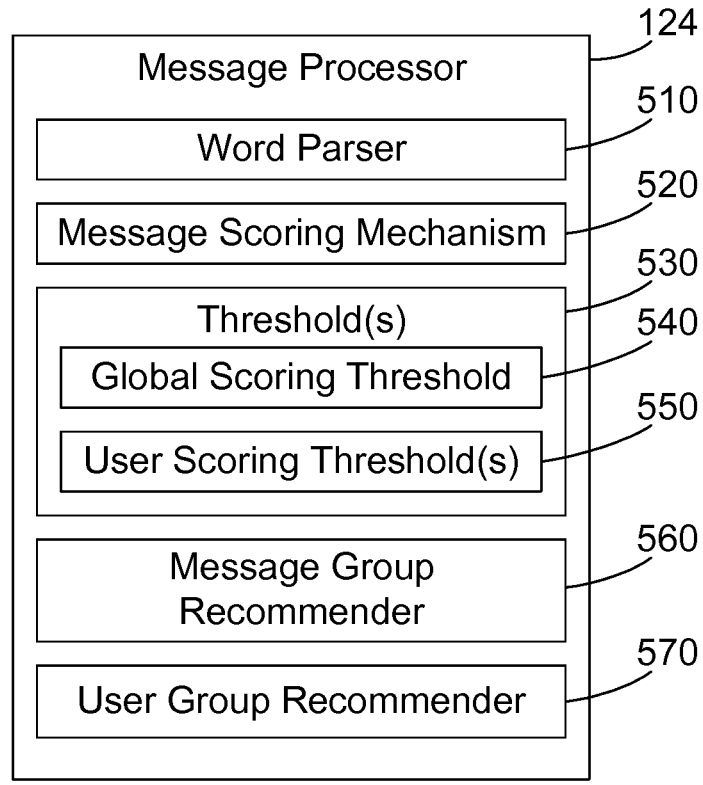
FIG. 5 is a block diagram of the message processor shown in FIG. 1.

The disclosure herein provides a way to communicate in a manner that is more natural by processing messages before they are posted to see if some potential recipients of the message should be filtered. Referring to FIG. 5, a message processor 124 shows additional details of the message processor 124 shown in FIG. 1. The message processor 124 includes a word parser 510, a message scoring mechanism 520, one or more thresholds 530, a message group recommender 560, and a user group recommender 570. The word parser 510 takes a message created by a user and parses the message into words, word stems and phrases. The message scoring mechanism 520 then scores the message according to suitable criteria relating to the processed message, including without limitation the number of words or phrases that appear in a filtered word/phrase list, a weighting of the words and phrases that indicates how strongly the word or phrase needs to be filtered, repetition of certain words or phrases, etc. The message scoring mechanism 520 thus provides contextual analysis for a message. The threshold(s) 530 may include a global scoring threshold 540 and one or more user scoring threshold(s) 550. The global scoring threshold 540 is a threshold that is set for all users. The user scoring threshold(s) 550 include a threshold for one or more users. User scoring thresholds 550 allow customizing the filtering of recipients of a post according to the perceived sensitivity of the recipients. Thus, a user with a perceived low tolerance for political discussions could have a user scoring threshold 550 set to more aggressively filter the user from posts the user may not want to see. In one particular implementation, the user scoring threshold(s) 550 are a single numerical value for each user. In a different implementation, the user scoring threshold(s) 550 may include many numerical values for many different criteria. Thus, a user might have a user scoring threshold 550 that specifies a low numerical value for any political messages, and a high numerical value for messages from co-workers. The thresholds 530 expressly extend to any suitable threshold or thresholds for determining whether a potential recipient of a message post should have access to the post.

A simple example will illustrate. Words and phrases in a message could be rated positive when the user approves of the message and negative when the user does not approve of the message. Over time, as many messages are processed, this could establish a weighting or score for various words and phrases that could indicate whether a word or phrase has either a positive or negative connotation to the user for messages the word or phrase appears in. By adding up the scores for the words and phrases in the message and dividing by the number of words in the message, a negative score might indicate a potential recipient may not like the message and a positive score might indicate the potential recipient may like the message. If the negative score reaches a certain threshold, the social media mechanism could take action to filter potential recipients of the message. The scores of various words and phrases could also be affected by the recipient's response, such as clicking on one of the feedback buttons, or by a natural language mechanism that looks for positive or negative reactions to a given message.

The message group recommender 560 makes recommendations to a user regarding what message group a message should be in. The user may define any suitable number and type of message groups, and the message group recommender 560 uses the words in the message found by the word parser and scores for those words to recommend a message group for a message. For example, if a message references the name of a college a user attended, and there is a message group defined for that college, the message group recommender 560 could recommend to the user that the message be placed in the message group for those who attended that college.

The user group recommender 570 provides a similar function, but with respect to user groups instead of message groups. Thus, based on the content of a message and the user who created the message, and user group recommender may recommend a particular user group for a message. For example, if a message references the name of a company where the user is an employee, and there is a user group called "co-workers", the user group recommender could recommend to the user that the message be placed in the co-worker user group. As the names suggest, the message group recommender 560 and user group recommender 570 may provide recommendations that help a user determine how to categorize a message so the message may be easily found later. The user can always disregard the recommendations and choose not to assign a message group or a user group for a message, or may choose to assign a different message group or user group from those that were recommended by the message group recommender 560 and user group recommender 570.

Figure 6:
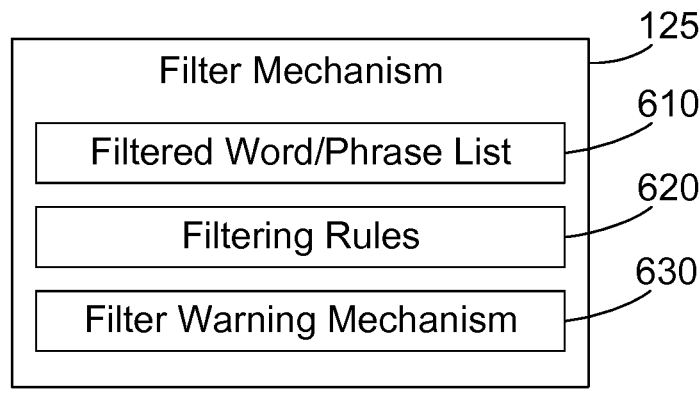
FIG. 6 is a block diagram of the filter mechanism shown in FIG. 1.

Referring to FIG. 6, the filter mechanism 125 shows additional details of the filter mechanism 125 shown in FIG. 1. The filter mechanism 125 includes a filtered word/phrase list 610, filtering rules 620, and a filter warning mechanism 630. The filter word/phase list 610 includes words, word stems and phrases that could trigger the need to filter recipients of a message based on the message content so less than all intended recipients receive the message. The message scoring mechanism 520 in FIG. 5 scores a message by comparing the words and phrases in a message to the filtered word/phrase list 610. The filtering rules 620 provide rules that govern when filtering of recipients is recommended for a message. Filtering rules 620 may include one or more rules that apply to all messages for all users. In the alternative, filtering ruled 620 may include different rules for different users. For example, if a user posts a message and receives feedback from an authorized user that the authorized user was greatly offended by the message, the user could define a filtering rule for the offended user to filter (exclude) the user from future messages that have certain words or phrases. In similar fashion, filtering rules 620 could include rules for different user groups. The filtering rules 620 may also be arranged into a hierarchy that determines how the rules are applied. For example, two different filtering rules might apply to a message, one based on the user, and one based on the user group for the user. The filtering rules could indicate which of these rules should be applied to a particular message when more than one rule could be applied to the message. Filtering rules 620 expressly extend to any suitable rule or combination of rules in any suitable hierarchy that allows applying the rules to filter potential recipients of a message.

The filter warning mechanism 630 prompts a user with a warning that potential recipients of a message, based on the filtered word/phrase list 610 and the filtering rules 620, should perhaps be filtered to prevent the message from reaching some of the potential recipients. When the filter warning mechanism 630 provides such a warning prompt to a user, the user may enable the recommended filtering so that some of the potential recipients are filtered (excluded) from accessing the message. In the alternative, the user may choose to ignore the recommended filtering and post the message to all authorized users. The message processor 125 combined with the filter warning mechanism 126 provide an automated way to process a message, detect when recipients may need to be filtered, and prompt the user regarding the suggested filtering so the user does not inadvertently post a message to users who should be filtered from viewing the post.

Figure 7:
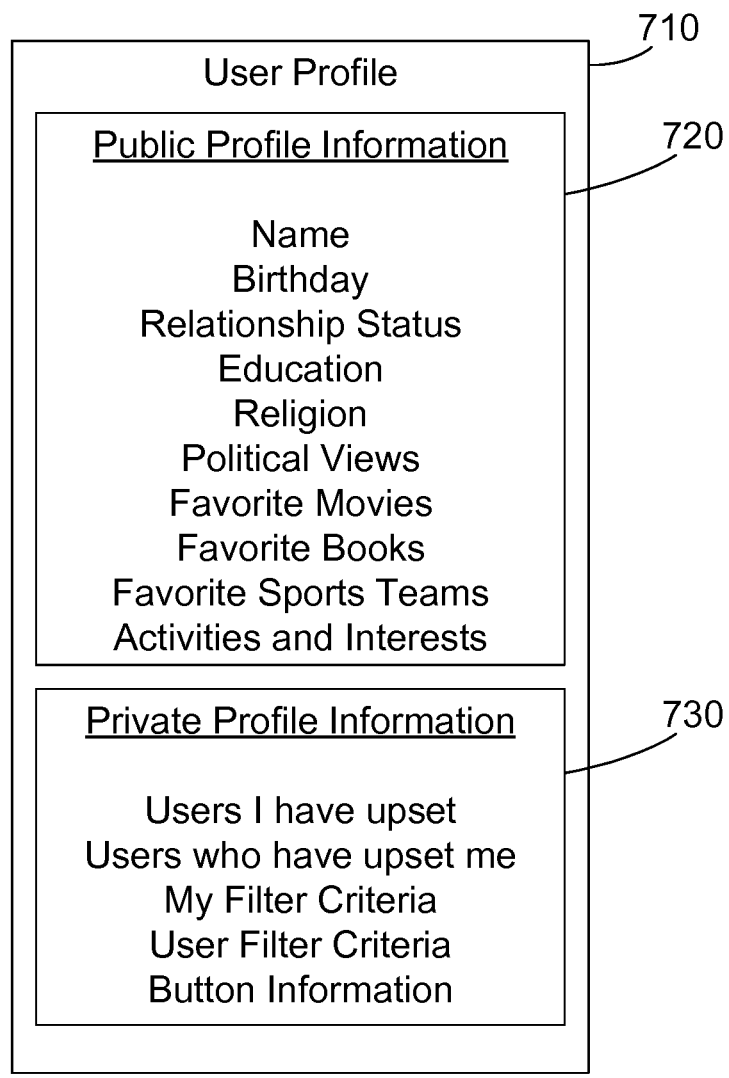
FIG. 7 is a block diagram of one of the user profiles shown in FIG. 1.

Referring to FIG. 7, a user profile 710 includes public profile information 720 and private profile information 730. The public profile information 720 includes information that may be seen by others in the social media network, and may include information such as name, birthday, relationship status, education, religion, political views, favorite movies, favorite books, favorite sports teams, and activities and interests. Such public profile information 720 is known in the art, and may contain any suitable information the user wants to share with other users. The user profile may also include private profile information 730. While known social media systems may include private profile information for users that the user does not want to share, the private profile information 730 includes feedback from other users regarding past messages. While the private profile information 730 preferably may not be viewed directly by another user, the private profile information 730 could be used by the social media mechanism of another user in determining whether the user should be filtered from a message post. Thus, the private profile information 730 is "private" in the sense that other users may not directly view this information, but the private profile information 730 may be sent to the social network mechanism of another user to help determine whether the social network mechanism of that user should filter the user from receiving a message.

Examples of information that could be included in the private profile information 730 includes relationship between users, users this user has upset, users who have upset this user, filter criteria for the user, filter criteria for one or more other users, and information from buttons that provide feedback about messages. In a first particular implementation, private profile information 730 may be entered, viewed and edited by the user. In a second particular implementation, some of private profile information 730 may be entered, viewed and edited by the user, some of the private profile information 730 may be viewed but not entered or edited by the user, and some of the private profile information 730 may be hidden from the user so the user cannot enter, view or edit the information. In a third particular implementation, all of the private profile information 730 may be viewed by the user but may not be entered or edited by the user. In a fourth particular implementation, all of the private profile information 730 may be hidden from the user so the user cannot enter, view or edit the information. The disclosure and claims herein extend to any and all combinations of private profile information that may be entered by a user, viewed by a user, and/or edited by a user, as well as any and all combinations of private profile information that may not be entered by a user, may not be viewed by a user, and/or may not be edited by a user. In one preferred implementation, data is added to the private profile information 730 automatically by the social media mechanism 123 in FIG. 1 based on messages, interactions, and button presses without the user needing to do anything further. In this manner, feedback information for past messages may be placed in the private profile information for a user so this information may be used by the filtering rules 620 in processing future messages to customize the filtering of message recipients based on the feedback received from other users. Note the private profile information 730 may include information received from the social network mechanisms of other users in response to the user sending a message to other users.

Figure 8:
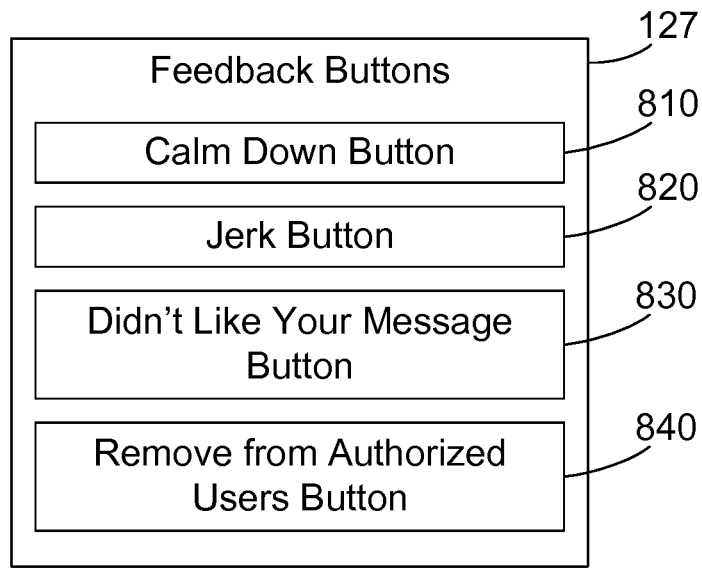
FIG. 8 is a block diagram of the feedback buttons shown in FIG. 1.

Referring to FIG. 8, the feedback buttons 127 shows additional details of the feedback buttons 127 shown in FIG. 1. The feedback buttons 127 may include an Inappropriate Content button 810, an Inappropriate Tone button 820, an I'm Offended button 830, a Didn't Like Your Message button 840, and a Remove from Authorized Users button 850. If a first user receives a post from a second user with content the first user feels is inappropriate, the first user could click the Inappropriate Content button 810, which causes the social media mechanism 123 of the first user to write to the private profile information 730 of the second user indicating the first user clicked the Inappropriate Content button 810. If a first user receives a post from a second user with a tone the first user feels is inappropriate, the first user could click the Inappropriate Tone button 820, which causes the social media mechanism 123 of the first user to write to the private profile information 730 of the second user indicating the first user clicked the Inappropriate Tone button 820. If the first user receives a post from a second user that offends the first user, the first user could click the I'm Offended button 830, which causes the social media mechanism 123 of the first user to write to the private profile information 730 of the second user indicating the first user clicked the I'm Offended button 830. If the first user receives a post from a second user that the first user didn't like, the first user could click the Didn't Like Your Message button 830, which causes the social media mechanism 123 of the first user to write to the private profile information 730 of the second user indicating the first user clicked the Didn't Like Your Message button 840. If the first user decides he or she no longer wants the second user to be an authorized user, the first user may click on the Remove from Authorized Users button 850 to remove the second user from the first user's list of authorized users. Of course, many other feedback buttons not shown in FIG. 8 could be used and are within the scope of the disclosure and claims herein.

The feedback buttons 127 provide a user a very simple and easy means for communicating regarding a message received from another user. In the most preferred implementation, the information from the feedback buttons may be automatically added to the private profile information for a user who sent a message that caused one or more of the feedback buttons to be pressed by a recipient. In one particular implementation, the feedback buttons 127 provide feedback to a user via additions to the user's private profile information 730 in an anonymous fashion so the user does not know which users pressed the buttons to give the feedback. In another particular implementation, the feedback buttons 127 could generate feedback that includes the identity of the user who provided the feedback if the user who provided this feedback enables this identification. In yet another particular implementation, the feedback buttons 127 could generate feedback that correlates the feedback to the users who created the feedback. The disclosure and claims herein extend to any suitable way of providing feedback to a user based on another user pressing one or more of the feedback buttons in response to a message. Note the feedback buttons may be enabled at different times. For example, the Remove from Authorized Users button 850 could be initially hidden, and after clicking on the I'm Offended button 830 or the Didn't Like Your Message button 840 the Remove from Authorized Users button 850 could be displayed to give the user the option of removing the user who posted the message from the authorized user list.

Figure 9:
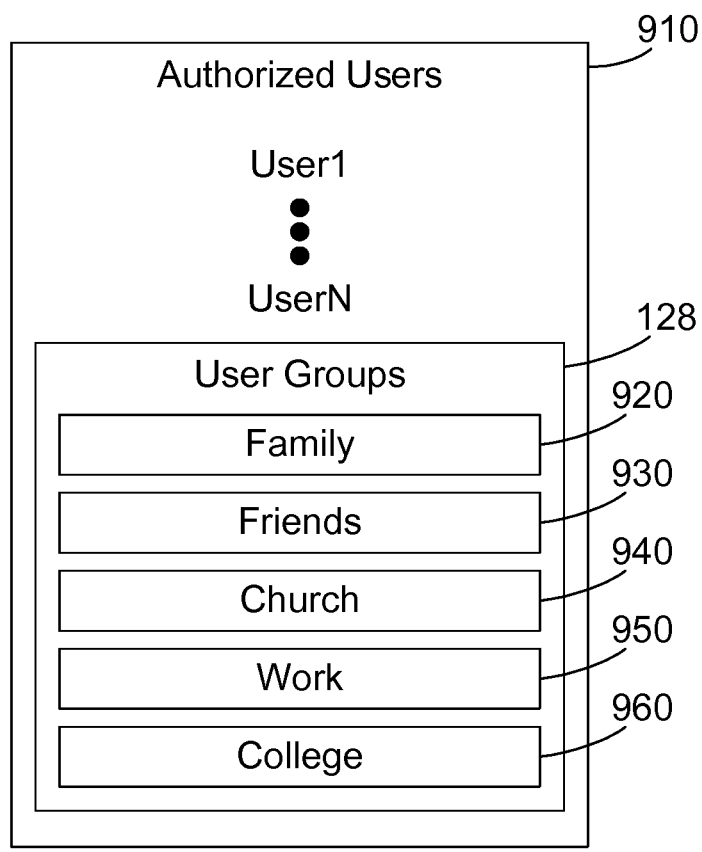
FIG. 9 is a block diagram showing authorized users for the social media mechanism in FIG. 1.

Referring to FIG. 9, authorized users 910 may include individual users, shown in FIG. 9 as User1, . . . , UserN, and may also include defined user groups 128. Examples of user groups include Family 920, Friends 930, Church 940, Work 950 and College 960. Of course, any suitable group of users could be defined. In one particular implementation, the user defines the user groups 128, and the user group recommender 570 in FIG. 5 may recommend a message be placed in one of the user groups 128 defined by the user. In an alternative implementation, the user group recommender 570 may recommend a message be placed in one of the user groups defined by the user, or may recommend a new user group be created by prompting a user for creation of a new user group. By categorizing messages according to user groups, the messages may be easily managed and retrieved in the future.

Figure 10:
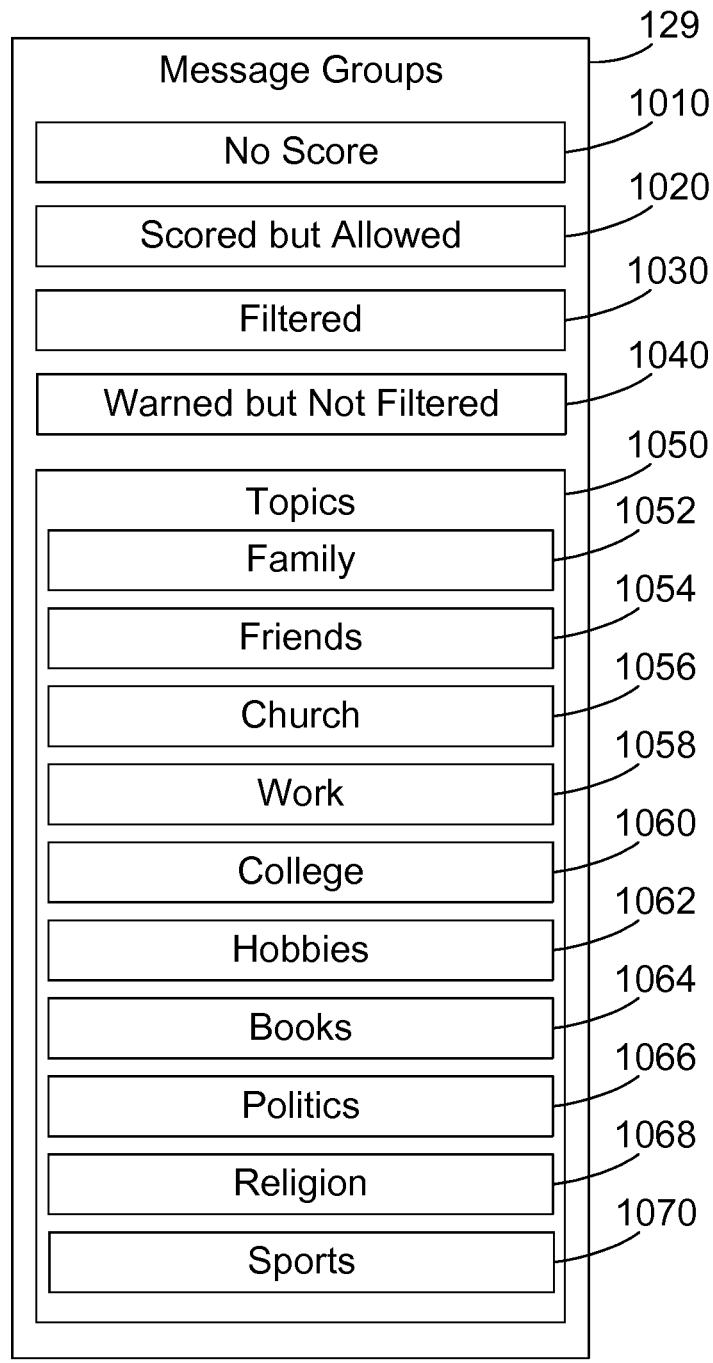
FIG. 10 is a block diagram showing example message groups for the social media mechanism in FIG. 1.

Referring to FIG. 10, message groups 129 show additional details of the message groups 129 shown in FIG. 1. Messages may be categorized by message group in addition to being categorized in user groups as shown in FIG. 9. In FIG. 10, message groups include a No Score message group 1010, a Scored but Allowed message group 1020, a Filtered message group 1030, and a Warned but Not Filtered message group 1040. The No Score message group 1010 includes messages scored by the message scoring mechanism 520 in FIG. 5 that have a zero score, meaning there were no words or phrases in the messages that were in the filtered word/phrase list 610 in FIG. 6. The Scored but Allowed message group 1020 includes messages scored by the message scoring mechanism 520 in FIG. 5 that has a non-zero score, meaning there were words or phrases in the message that were in the filtered word/phrase list 610 in FIG. 6, but the score was not sufficient to warrant filtering according to the threshold(s) 530 and the filtering rules 620. The Filtered message group 1030 includes messages scored by the message scoring mechanism 520 in FIG. 5 that has a score that caused the filter warning mechanism 630 to prompt the user with a warning that filtering of the recipients may be necessary, followed by the user enabling filtering of recipients of the message. The Warned but Not Filtered message group 1040 includes messages scored by the message scoring mechanism 520 in FIG. 5 that has a score that caused the filter warning mechanism 630 to prompt the user with a warning that filtering of the recipients may be necessary, followed by the user choosing not to enable filtering of recipients of the message, causing the message to be posted to all authorized users. Message groups 129 may include user-created or suggested topics 1050, which are shown in FIG. 10 to include Family 1052, Friends 1054, Church 1056, Work 1058, College 1060, Hobbies 1062, Books 1064, Politics 1066, Religion 1068, and Sports 1070. Of course, any message group could be defined, including message groups for any suitable topic. The message group recommender 560 in FIG. 5 may recommend to a user a message group for a message based on the content in the message, the user who sent the message, and any other suitable criteria.

Figure 11:
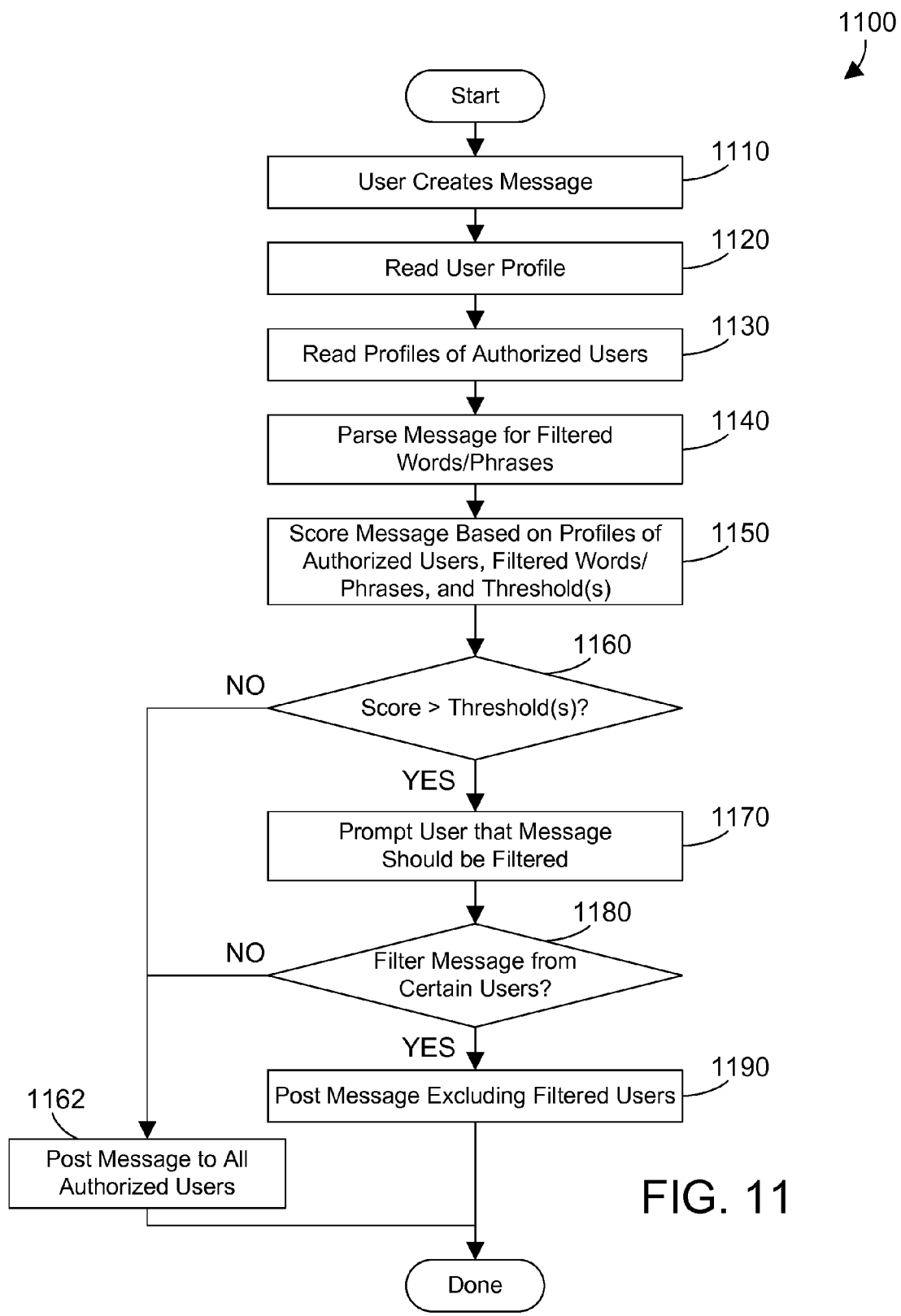
FIG. 11 is a flow diagram of a method for the social media mechanism in FIG. 1.

Referring to FIG. 11, a method 1100 is preferably performed by the social media mechanism 123 shown in FIG. 1. A user creates a message (step 1110). The user profile for the user who created the message is read (step 1120). The profiles of authorized users are also read (step 1130). The message is parsed for filtered words and phrases (step 1140). The message is scored based on the profiles of the authorized users, the filtered words/phrases, and threshold(s) based on the filtering rules 620 shown in FIG. 6 (step 1150). If the score is not greater than the threshold(s) (step 1160=NO), the message is posted to all authorized users (step 1162). If the score is greater than the threshold(s) (step 1160=YES), the user is prompted that recipients of the message should be filtered (step 1170). If the user enables the filtering (step 1180=YES), the message is posted to exclude the filtered users (step 1190). If the user does not enable filtering (step 1180=NO), the message is posted to all authorized users (step 1162). Method 1100 is then done.

Method 1100 illustrates that the social media mechanism 123 may make prompt a user when recipients of a message should be filtered according to the defined criteria, but the user is given control over whether to enable the filtering or not. Method 1100 thus serves as a reminder to a user when a message written by the user could or should be filtered from certain recipients. For example, if a user has a friend who is sensitive about a certain subject, and has expressed opinions in the past unfavorable to that subject, method 1100 could provide a reminder to the user when the user creates a message that includes content relating to that subject that the friend could be filtered from receiving the message. The social media mechanism disclosed and claimed herein has particular application to filtering recipients of a message the recipients may find offensive by warning the user and allowing the user to enable the filtering before posting the message.

Note that method 1100 is one simplified example of one possible way the social media mechanism 123 could function. Many other functions are possible within the scope of the disclosure and claims herein, some of which are discussed above.

The social media mechanism disclosed and claimed herein applies to a user posting a message to the user's own message area, and also applies to a user posting a message to the message area of a different user.

The filtering of messages may be performed in any suitable way. For example, a message that is filtered from a particular user could not even show up in the message viewing area when viewed by the filtered user. In the alternative, an icon or other indication could indicate a message was posted, but the filtered user was filtered and thus cannot see the message. If the filtered user is made aware of the filtering, a feedback mechanism could be added that would allow the filtered user to specifically request access to the filtered message from the user who posted the message. If the user who posted the message then consents to the request to access the filtered message, the filtered user could then view the message.

The disclosure and claims relate to a social media mechanism and method for processing messages for content that may require filtering, and informing a user who drafted the message when the message might need to be filtered so it is not sent to all potential recipients of the message. The user may then select to send the message to all potential recipients, or to filter the recipients so the message is sent to less than all of the potential recipients. User profiles are created and maintained, and may include information that helps to determine when filtering of messages is desirable. Feedback buttons are also provided to provide feedback when a user does not like a message.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A computer-implemented method executed by at least one processor for a social media mechanism to post a message, the method comprising the steps of:
  processing the message by a user to determine whether the message includes words, word stems or phrases that indicate recipients of the message should be filtered, wherein processing message comprises:
  parsing the message into words, word stems and phrases;
  comparing the words, word stems and phrases in the message with a list of filtered words, word stems, and phrases;
  scores the message according to the words, word stems and phrases in the message that are in the list of filtered words, word stems and phrases and according to a user profile corresponding to the user; and
  compares the score with a threshold value;
  when the message has a score that exceeds the threshold value, prompting the user to indicate the recipients of the message should be filtered:
  in response to the user prompt, when the user enables the filtering of the recipients of the message, posting the message to less than all of the recipients; and
  in response to the user prompt, when the user does not enable the filtering of the recipients of the message, posting the message to all of the recipients; and
  when the message has a score that does not exceed the threshold value, not prompting the user and posting the message to all of the recipients;
  defining a plurality of user profiles in the social media mechanism, each user profile including public profile information that is visible to other users and private profile information that is not visible to other users, wherein the private profile information includes feedback information from other users regarding previously-sent message by a user corresponding to the user profile.

2. The method of claim 1 further comprising the step of recommending to the user a message group for the message based on the content in the message.

3. The method of claim 1 further comprising the step of recommending to the user a user group for the message.

4. The method of claim 1 further comprising the step of providing a plurality of feedback buttons to the user fo the user to provide feedback to another user, the plurality of feedback buttons including an inappropriate content button, an inappropriate tone button, and I'm offended button, a didn't like your message button, and a remove from authorized users button, wherein activating one of the plurality of feedback buttons causes information to be added to the private profile information of the user who posted a message.

5. A computer-implemented method executed by at least one processor for a social media mechanism to post a message, the method comprising the steps of:
  processing the message by a user to determine whether the message includes words, word stems or phrases that indicate recipients of the message should be filtered, the processing of the message comprising the steps of:
  parsing the message into words, word stems and phrases;
  comparing the words, word stems and phrases with a list of filtered words, word stems and phrases;
  scoring the message according to the words, word stems and phrases in the message that are in the list of filtered words, word stems and phrases and according to a user profile corresponding to the user;
  comparing the score with a threshold value;
  when the score exceeds the threshold value, providing the user prompt; and
  when the score does not exceed the threshold value, not providing the user prompt and posting the message to all of the recipients;
  when the message includes words, word stems or phrases that indicate the recipients of the message should be filtered, prompting the user to indicate the recipients of the message should be filtered;
  in response to the user prompt, when the user enables the filtering of the recipients of the message, posting the message to less than all of the recipients;
  in response to the user prompt, when the user does not enable the filtering of the recipients of the message, posting the message to all of the recipients;
  recommending to the user a message group for the message based on the words in the message;
  recommending to the user a user group for the message;
  defining a plurality of user profiles in the social media mechanism, each user profile including public profile information that is visible to other users and private profile information that is not visible to other users, wherein the private profile information includes feedback information from other users regarding previously-sent messages by a user corresponding to the user profile; and
  providing a plurality of feedback buttons to the user for the user to provide feedback to another user, the plurality of feedback buttons including an inappropriate content button, an inappropriate tone button, and I'm offended button, a didn't like your message button, and a remove from authorized users button, wherein activating one of the plurality of feedback buttons causes information to be added to the private profile information of the user who posted a message.

6. A computer-implemented method executed by at least one processor for a social media mechanism to post a message, the method comprising the steps of:

processing the message by a user to determine whether the message includes words, word stems or phrases that indicate recipients of the message should be filtered, wherein processing the message comprises:

parsing the message into words, word stems and phrases, comparing the words, word stems and phrases in the message with a list of filtered words, word stems and phrases;

scores the message according to the words, word stems and phrases in the message that are in the list of filtered words, word stems and phrases and according to a user profile corresponding to the user; and compares the score with a threshold value;

when the message has a score that exceeds the threshold value, prompting the user to indicate the recipients of the message should be filtered:

in response to the user prompt, when the user enables the filtering of the recipients of the message, posting the message to less than all of the recipients; and in response to the user prompt, when the user does not enable the filtering of the recipients of the message, posting the message to all of the recipients; and when the message has a score that does not exceed the threshold value, not prompting the user and posting the message to all of the recipients;

recommending to the user a message group for the message based on the content in the message;

defining a plurality of user profiles in the social media mechanism, each user profile including public profile information that is visible to other users and private profile information that is not visible to other users, wherein the private profile information includes feedback information from other users regarding previously-sent messages by a user corresponding to the user profile; and providing a plurality of feedback buttons to the user for the user to provide feedback to another user, the plurality of feedback buttons including an inappropriate content button, an inappropriate tone button, and I'm offended button, a didn't like your message button, and a remove from authorized users button, wherein activating one of the plurality of feedback buttons causes information to be added to the private profile information of the user who posted a message.

* * * * *